United States Patent [19]

Ewing

[11] Patent Number: 5,190,423
[45] Date of Patent: Mar. 2, 1993

[54] LOCKING FASTENER

[76] Inventor: Paul E. Ewing, 32005 Alameda, Farmington Hills, Mich. 48336

[21] Appl. No.: 656,569

[22] Filed: Feb. 15, 1991

[51] Int. Cl.⁵ ............................................. F16B 39/00
[52] U.S. Cl. .................................. 411/134; 411/144; 411/149; 411/432; 411/533
[58] Field of Search ............... 411/154, 149, 146, 132, 411/134, 332, 293, 428, 432, 534, 533, 144, 956, 960, 964, 965

[56] References Cited

U.S. PATENT DOCUMENTS

| | | | |
|---|---|---|---|
| 525,837 | 9/1894 | Brown | 411/132 X |
| 625,529 | 5/1899 | Andress | 411/149 X |
| 910,712 | 1/1909 | McCoy | 411/149 X |
| 2,518,468 | 8/1950 | Harding | 411/428 X |
| 3,238,581 | 3/1966 | Sawyer | 411/533 X |
| 3,241,589 | 3/1966 | Enders | 411/144 X |
| 3,329,190 | 7/1967 | Oldenkott | 411/149 X |
| 3,417,802 | 12/1968 | Oldenkott | 411/134 |
| 3,680,619 | 8/1972 | Sparks | 411/134 |
| 3,914,178 | 10/1975 | Fineran et al. | 411/930 X |
| 4,055,208 | 10/1977 | Blaul | 411/134 |
| 4,969,788 | 11/1990 | Goiny | 411/428 |
| 5,011,351 | 4/1991 | Terry | 411/144 |

FOREIGN PATENT DOCUMENTS

| | | | |
|---|---|---|---|
| 684466 | 11/1939 | Fed. Rep. of Germany | 411/149 |
| 129964 | 1/1929 | Switzerland | 411/223 |
| 910258 | 11/1962 | United Kingdom | 411/152 |

Primary Examiner—Rodney M. Lindsey
Attorney, Agent, or Firm—Reising, Ethington, Barnard, Perry & Milton

[57] ABSTRACT

A locking threaded fastener of the wedge-action type is disclosed with threaded and threadless nut members with wedge elements therebetween for wedging the nut members apart when the threaded nut member is turned in the loosening direction. In a two-piece nut, the threadless nut member has a flat inner surface for engaging the workpiece and the wedge elements have engaging surfaces with a coefficient of friction therebetween which is less than that between the flat inner surface and the workpiece surface. In a three-piece nut, a third nut member, in the form of a washer, is provided with a flat inner surface for engaging the workpiece. The wedge elements have engaging surfaces with a coefficient of friction less than that between the third nut member and the threadless nut member which, in turn, is less than that between the third nut member in the workpiece.

8 Claims, 2 Drawing Sheets

LOCKING FASTENER

FIELD OF THE INVENTION

This invention relates to locking threaded fasteners; more particularly, it relates to such fasteners in which a wedging action is employed to jam or bind the threads to prevent unwanted loosening of the fastener.

BACKGROUND OF THE INVENTION

There are many applications of threaded fasteners which require a so-called "locking fastener"; as used herein the term "locking fastener" means a threaded fastener which includes means for inhibiting unwanted loosening of the fastener to a greater extent than that which results from the friction which resists turning of one of the threaded members relative to the other in the loosening direction. In many applications of locking fasteners, it is also required that the fastener can be purposely loosened and removed and reinstalled without degradation of the parts.

There have been many proposals in the prior art to meet such requirements in threaded fasteners by using wedging action which causes interference or jamming of the threads in response to unwanted rotation of one of the fastener members. In such devices, the thread jamming is usually achieved by providing a ramp surface with a greater angle than the angle of the threads so that loosening rotation of the nut, for example, will cause it to back off axially at a faster rate than that permitted by the threads. This kind of coaction between wedging surfaces and fastener threads has been proposed to be accomplished by special washers with ramp surfaces. Also, the prior art includes proposals to incorporate the wedging surfaces in the structure of the fastener nut.

The use of wedging surfaces on washers is described in Trimble et al U.S. Pat. No. 428,183 granted May 20, 1890, Terry U.S. Pat. No. 2,665,729 granted Jan. 12, 1954 and Herpolsheimer U.S. Pat. No. 3,263,727 granted Aug. 2, 1966. In the Trimble et al patent and the Herpolsheimer patent, a conventional bolt and nut are used with a pair of special washers disposed between the nut and the workpiece, the washers being non-split annular members. Both of these patents disclose teeth on the surface of the inner washer which engages the workpiece and teeth on the surface of the outer washer which engages the nut to provide a greater resistance to rotation than that between the engaging faces of the two washers. This arrangement is provided to ensure that any rotation of the nut in the loosening or unscrewing direction will cause the wedging surfaces to rotate relative to each other and jam the threads to provide locking action against loosening.

In Trimble et al one of the opposed washer faces is provided with plural ramp surfaces and the other opposed washer face is provided with an axial projection which engages the ramp surface. For removing the nut, the Trimble et al patent discloses a notch in one of the washers at the end of the ramp to receive the projection whereby the combined thickness of the washers is reduced and the nut may be unscrewed without jamming of the threads.

In Herpolsheimer, the opposed washer surfaces are provided with opposed engaging ramp surfaces. The Herpolsheimer patent discloses that the nut may be removed by applying sufficient loosening torque to the nut to cause the ramp surfaces of the respective washers to override each other, the elongation of the bolt resulting therefrom being less than the yield point of the bolt. Also, it is noted that in Herpolsheimer, the nut could be removed by holding it against rotation and turning the bolt head in the loosening direction without the washers causing jamming of the threads.

A locking fastener with a single piece washer incorporating ramp surfaces for wedging action is disclosed in the Terry Pat. No. 2,665,729 granted Jan. 12, 1954. This locking fastener utilizes a conventional bolt and nut with a split washer between the nut and workpiece, the washer having overlapping ends with confronting ramp surfaces. The inner face of the washer opposite the workpiece is provided with serrations adjacent the free end and the outer face is also provided with serrations adjacent the free end for engagement with the nut. When the nut is tightened, the serrations on the washer tend to bite into the workpiece to resist rotation thereof and the serrations on the outer surface of the washer tend to bite into the nut and move therewith during tightening so that the washer is enlarged circumferentially and the washer thickness at the overlapping ends is reduced to a minimum value. Terry describes this action as having the result of tensioning the washers so that the overlapping ends are urged to contract toward each other by the tension forces set up in the washer; further, the tension forces urge the free ends of the washer toward each other so that the confronting ramps develop wedging forces which result in jamming of the threads to prevent loosening. The Terry patent describes an arrangement to limit the locking effect and thus permit removal of the nut by torquing it in the loosening direction. This arrangement comprises an axial shoulder on each ramp which is abutted by the free end of the other ramp to limit the thickness of the washer at its free end when the nut is turned in the loosening direction.

The Terry Pat. No. 4,708,555 granted Nov. 24, 1987 discloses a locking fastener using a split washer with confronting surfaces similar to that in the afore-mentioned Terry patent; it also discloses a pair of washers with confronting ramp surfaces. The later Terry patent describes the use of spring means for yieldably resisting relative movement of the confronting ramp surfaces in the tightening direction for storing energy to bias the ramp surfaces in the loosening direction to thereby cause jamming of the threads to prevent loosening of the nut. In the disclosure of this Terry patent, serrations are provided on the inner surface of the washer which engages the workpiece and on the outer surface of the washer which engages the nut.

The prior art also includes a locking fastener of the wedging type in which ramp surfaces are provided on the nut itself which is used in conjunction with a special washer. Such a locking fastener is disclosed in the above-mentioned Herpolsheimer Pat. No. 3,263,727 and the Terry Pat. No. 4,708,555. The Herpolsheimer patent discloses a bolt head having ramp surfaces which coact with confronting ramp surfaces on a special washer. The washer is provided with teeth which engage the workpiece to prevent rotation of the washer with the bolt head when it is turned in a loosening direction. The bolt is removed by applying sufficient torque to override the ramp surfaces which are of such dimension that the elastic limit of the bolt is not exceeded. The Terry Pat. No. 4,708,555 discloses a bolt having a nut provided with the ramp surfaces which confront corresponding ramp surfaces on a special washer. The nut in the Terry patent is removed by turning it and the washer simultaneously in the loosening direction to avoid the wedging action which would jam the threads.

Shortcomings Of The Prior Art

Many applications of threaded fasteners require installation of the fastener so that a certain value of tension is developed in the fastener. As is well-known, the purpose of a specified tension is to ensure that the desired holding force is applied to the workpiece and also to set up a frictional restraint against unwanted loosening of the threaded fastener. A common practice, used in threaded fastener installation to obtain the desired tension, is to specify the amount of torque to be applied in tightening the fastener. In use of standard commercial fasteners, this practice of relying upon a relationship between applied torque and resulting fastener tension is acceptable in many applications. It is known however that the relationship of torque and tension varies considerably from case-to-case; the applied torque is taken up by frictional resistance. The frictional resistance to the tightening of the fastener includes not only friction of the threads but also the friction between the face of the fastener member, e.g. the nut, and the workpiece surface which it engages. In standard commercial threaded fasteners, the torque tension/relationship is approximately known and repeatable and, as a practical matter, is relied upon for installation purposes.

However, the prior art locking fasteners of the wedge-action type are not capable of installation with a reasonably known and repeatable torque/tension relationship. This results from the requirement in such locking fasteners of the serrated or toothed surface on the nut or the washer engaging the surface of the workpiece. This feature is designed into the fastener to maximize the resistance to turning, as discussed above, to thereby enable the wedging surfaces to jam the threads without unscrewing the nut. This prior art structure results in two detrimental effects: 1) there is a great reduction in the tension developed in the fastener at a given torque because a large amount of the applied torque is taken up by the rotational resistance caused by the teeth biting into the workpiece surface and 2) the rotation of the serrated nut or washer causes galling and scouring of the workpiece surface. Thus, in the first installation, the torque tension relationship is unpredictable and often results in a low value of fastener tension which is inadequate to prevent loosening of the fastener and is also less than the required loading force for the workpiece. In case of removal and reinstallation of the fastener, the engaging surfaces are further altered by the scouring action with a different resulting torque/tension relationship. Further, such scouring effects may cause stress risers and weaken the area around bolt holes.

A general object of this invention is to provide an improved locking threaded fastener of the wedge-action type which overcomes certain disadvantages of the prior art.

SUMMARY OF THE INVENTION

In accordance with this invention, a locking threaded fastener of the wedge-action type is provided which avoids the need for serrated or toothed surfaces in engagement with the workpiece.

Further, in accordance with this invention, a locking threaded fastener of the wedge-action type is provided which exhibits a predictable and repeatable torque/tension relationship with a very large percentage of the applied torque being effective to develop tension in the fastener.

Further, in accordance with this invention, a locking threaded fastener of the wedge-action type is provided in which a fastener loading is distributed over a larger number of threads than that achieved in the prior art devices.

This invention is incorporated in a lock nut assemblage for use in a locking threaded fastener of the type which comprises a threaded shank, such as a bolt or stud, and a nut assemblage. The lock nut assemblage comprises a threaded nut and a threadless nut with means for coupling them together for rotation when the threaded nut is tightened and wedge means for wedging the nut members apart when the threaded nut is turned in the loosening direction whereby the threads are jammed and inhibit loosening of the threaded nut. In a first embodiment of the invention, the nut assemblage comprises a two-piece nut in which the threadless nut member has a flat inner surface for engaging the workpiece and the wedge means has engaging surfaces with a coefficient of friction therebetween which is less than the coefficient of friction between the flat inner surface and the workpiece surface. Preferably, the wedge means comprises a plurality of ramps on the inner face of the threaded nut member and a plurality of confronting ramps on the outer face of the threadless nut member with shoulders between adjacent ramps whereby rotation of the threaded nut member in the tightening direction causes driving engagement between the shoulders and rotation in the loosening direction causes axial movement between the nut members to cause locking by jamming of the threads. Preferably, according to the invention, the desired relationship of the coefficients of friction is obtained by a lubricating coating on the ramps and threads of the threaded nut member. Preferably, according to the invention, the threaded nut member and the threadless nut member are connected by means for limiting axial separation thereof while allowing unlimited relative rotation therebetween.

In a second embodiment of the invention the nut assemblage comprises a three-piece nut for use in a locking threaded fastener of the aforesaid type. In accordance with this embodiment of the invention, a third nut member is provided in the form of a washer with a flat inner surface for engaging the workpiece; a flat outer surface on the third nut member engages the flat inner surface on the threadless nut member. The wedge means has engaging surfaces with a coefficient of friction less than that between the third nut member and the threadless nut member which, in turn, is less than that between the third nut member and the workpiece. Preferably, the wedge means comprises ramps with shoulders therebetween as described above. Preferably, in accordance with the invention, the desired relationship of friction is obtained by a lubricating coating on the threads and ramps of the threaded nut member. Preferably, in accordance with the invention, the three-piece nut assemblage is provided as a captive assembly by means on the threaded nut member which retains the threadless nut member and the washer member together with limited freedom of axial motion therebetween and unlimited relative rotational motion therebetween.

In accordance with a third embodiment of the invention, a three-piece nut assemblage is provided as described above with the additional provision of mechanical interlocking means for rotatably coupling the threadless nut member and the washer for resisting rotation of the nut member in the loosening direction whereby the off-torque for the fastener is controlled to be greater than the on-torque.

Further, in accordance with the invention, in both the two-piece and three-piece nut assemblage, a captive assembly of the parts is provided by a tailpiece or sleeve axially extending from the threaded nut. In the case of the two-piece nut, the sleeve has a radial flange of larger diameter than the through-hole in the threadless nut whereby axial motion between the threaded and threadless nut is limited without limiting rotational motion. In the three-piece nut, the sleeve extends through the threadless nut into the washer and has a radial flange of larger diameter than the through-hole in the washer whereby axial motion of the members is limited without limiting rotational motion In both the two-piece and three-piece nut assemblage, the threads of the threaded nut member are extended into the sleeve, which may be relatively thin, and thereby absorbs a portion of the loading on the threads of the nut.

A complete understanding of this invention may be obtained from the detailed description that follows taken with the accompanying drawings.

BEST MODE FOR CARRYING OUT THE INVENTION

Figure 1:
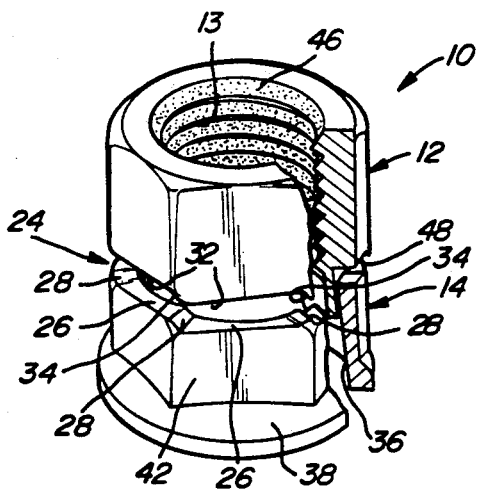
FIG. 1 is a perspective view of a two-piece nut, partially, in section.
Figure 2:
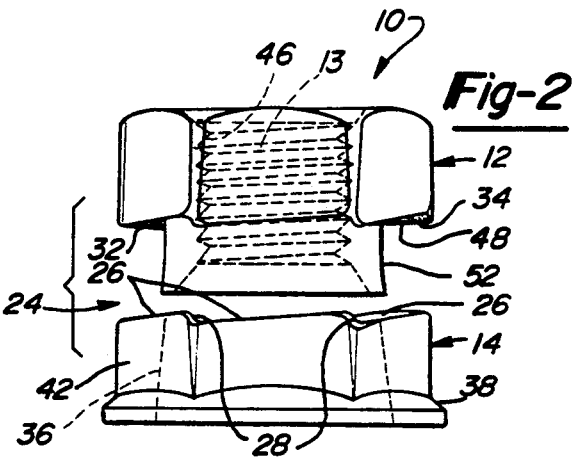
FIG. 2 is an exploded view in elevation of the two-piece nut.
Figure 3:
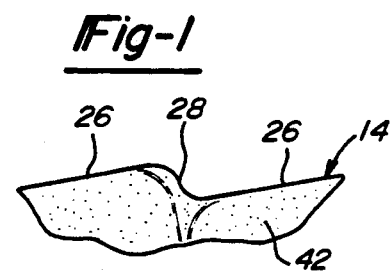
FIG. 3 shows a detail of construction.

Referring now to the drawings, illustrative embodiments of the invention are shown in two-piece and three-piece nut assemblages. It will be appreciated as the description proceeds that the invention may be realized in both nut and bolt head structures in a wide variety of embodiments and utilized in many different applications.

The embodiment of the invention in a two-piece nut assemblage will be described with reference to FIGS. 1 through 5. The two-piece lock nut 10 comprises a threaded nut member 12 and a threadless nut member 14. The nut member 12 is threaded with a conventional right hand thread, for example, and is adapted to be received on and threadedly engaged with a threaded shank 16 of a bolt 18. The bolt 18 extends through an opening in a workpiece 22 with the bolt head being seated on the opposite side of the workpiece.

Figure 4:
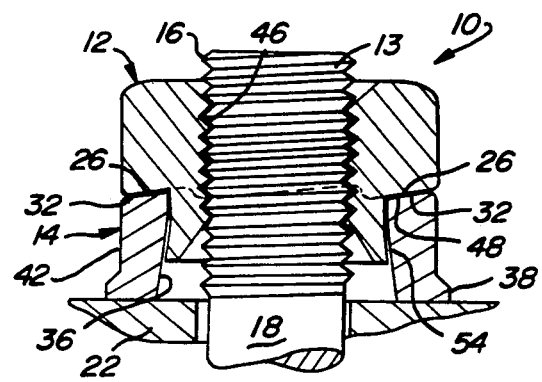
FIG. 4 shows the two-piece nut in its tightened condition.
Figure 5:
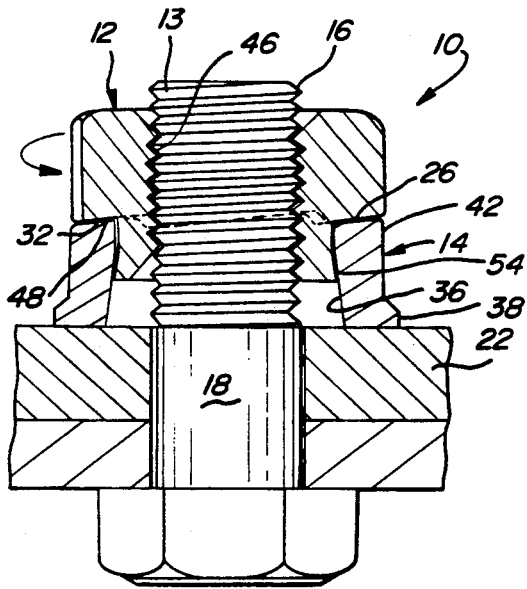
FIG. 5 shows the two-piece nut with the threaded nut member in a locked condition.

To provide a locking action between the lock nut 10 and the bolt 16, and thus prevent unwanted loosening of the nut, wedge means are provided for wedging the threaded nut member 12 and the unthreaded nut member 14 axially apart in response to rotation of the threaded nut member 12 in the loosening direction. The wedge means, indicated generally by the arrow 24, comprises a plurality of ramps 26 on the outer face of the unthreaded nut member 14, there being six such ramps in the illustrated nu&:. Each ramp 26 has a low end, relative the base of the nut member, and a high end and adjacent ramps are joined between the high end of one and the low end of the other by a shoulder 28. Each shoulder has an angle of inclination relative to the base of the nut member 14 which is much greater than the angle of the ramp. The wedge means also includes a plurality of ramps 32 on the inner face of the threaded nut member 12. Each ramp 32 has a high end relative to the outer face of the nut member 12 and a low end and the low end of one ramp 32 is joined with the high end of the adjacent ramp by a shoulder 34. The inclination of the ramps 32 is the same as that of the ramps 26 and the same is true with regard to the shoulders 34 and 28. Thus, the inner face of the nut member 12 nests with the outer face of the nut member 14 in a given rotative position with the shoulders 28 and 34 in engagement and the ramps 26 and 32 in engagement. This nesting relationship is depicted in FIG. 4. The angle of the ramps 26 and 32 relative to a plane perpendicular to the thread axis is greater than the angle of the threads in order to provide the locking action discussed above.

The threadless nut member 14 has a through-hole 36 which has a clearance fit with the bolt 18. It is provided with a cylindrical base 38 and a hexagonal head 42 which terminates in its upper face in the ramps 26 and shoulders 28. The inner face 44 of the threadless nut member 14 is a flat annular surface and is adapted to seat on a flat surface of the workpiece 22. The threadless nut member 14 and the threaded nut member 12 are, for example, both made of steel and are suitably cold formed. The bolt 18 is also suitably a cold formed steel part. The workpiece 22, for example, may be made of a ferrous metal. However, it will obvious that the fastener parts may be made of various metals and may be used with workpieces of different materials.

The two-piece lock nut 10 is constructed so that the coefficient of friction between the inner face of the threaded nut member 12 and the outer face of the threadless nut member 14 and that between the threads is less than the coefficient of friction between the inner face of the threadless nut member 14 and the surface of workpiece 22 with which it is to be used. This is provided by constructing the threaded nut member 12 with a lubricating coating 46 on the threads 13 and a lubricating coating 48 on the ramps 32 and shoulders 34. The lubricating coatings 46 and 48 may be a conventional fastener lubricant which becomes a permanent part of the fastener element. A preferred lubricant is a dry film solid lubricant comprising a blend of P.T.F.E. (polytetrafluorethylene) and molydisulfide. Such a lubricant is applied in a known manner during the manufacturing process of the fastener element.

The threaded nut member 12 and threadless nut member 14 are provided with tool receiving faces, suitably of hexagonal shape with the same outer dimension. This permits use of the same torque applying tool for tightening the nut 10 when it is engaged with only the member 12 and for loosening the nut 10 when the tool is engaged with both members 12 and 14, as will be described subsequently.

Preferably, the threadless nut member 14 is held captive with the threaded nut member 12. This is provided with axially extending cylindrical tailpiece or sleeve 52 which extends into the threadless nut member 14. For this purpose, the through-hole 36 of the threadless nut member 14 is tapered to a smaller diameter at its outer end and receives the sleeve 52 in its cylindrical form. After sleeve 52 is inserted into the through-hole 36, it is deformed outwardly to form an annular flange or flare 54. This provides a limited axial freedom of movement between the nut members 12 and 14 and unlimited rotational movement therebetween. Preferably, the threads 13 extend into the sleeve 52. This provides additional thread engagement with the threaded shank 16. Since the sleeve 52 is relatively thin-wall member, the threads therein absorb a portion of the load imposed by the threaded shank and decreases the load on the threads in the outer part of the nut member 12.

In use of the two part lock nut 10, the threaded nut member 12 is screwed onto the threaded shank of bolt 18 by a suitable wrench for applying the desired torque. In the tightening operation, the shoulders 34 will engage the shoulders 28 and the threadless nut member 14 will rotate with the nut member 12. The inner face of the threadless nut member 14 will engage and spin on the surface of the workpiece 22. Since the face 44 is smooth and flat, it will not gall or scour the surface of the workpiece. Further, because of the flat face 44, the torque/tension relationship in the fastener will be the same as in a standard, non-locking fastener.

In case the threaded nut member 12 is rotated in the loosening direction, as a result of vibration or some unwanted force, the loosening rotation will cause the ramps 32 to ride up the ramps 26. Since the angle of inclination of the ramp 26 is greater than that of the threads 13, the resulting relative movement of the threaded nut member 12 and the threadless nut member 14 will jam the threads 13 with the threads of the bolt 18. This will increase the tension in the bolt 18 and also prevent further loosening rotation of the threaded nut member 12, thus locking the nut assemblage 10 against unwanted loosening. When it is desired to loosen the fastener and remove the nut 10, the torque applying tool is fitted over the hex heads of both nut members 12 and 14 and they are rotated together to unscrew the threaded nut member 12 from the threaded shank 16.

The invention as described with reference to the two-piece nut above and as described with reference to the three-piece nut below can also be embodied in a bolt head structure wherein the bolt head replaces the threaded nut 12 and coacts with the threadless nut member 14 in the same manner.

A three-piece lock nut embodiment of this invention will be described with reference to FIG. 6. The lock nut assemblage 60 comprises the threaded nut member 12', a threadless nut member 14' and a washer member 62. The washer member 62 is annular with a through-hole having a clearance fit with the bolt extending through the workpiece (not shown). The through-hole 64 in the washer 62 is tapered with a smaller diameter at the outer face of the washer. The threaded nut member 12' and the threadless nut member 14' are of the same construction as members 12 and 14 described above with reference to FIGS. 1 through 5 except for the following difference. The nut member 12' is provided with a tailpiece or cylindrical sleeve 52' which extends all the way through the threadless nut member 14' and into the through-hole 64 of the washer member 62. The sleeve 52' is deformed outwardly after insertion into the washer 62 to hold the nut member 14' and washer 62 captive to the threaded nut member 12'. Wedge means 24' between the nut members 12' and 14' is the same as the wedge means 24 described with reference to FIGS. 1 through 5. The threads 13' and the upper face of the threaded nut member 12' are provided with a lubricated coating the same as described with reference to the embodiment of FIGS. 1 through 5. The threadless nut member 14' is shown in FIG. 6 as a plain hex head; it may be provided with a flange like the flange 38 of FIG. 1 in some applications.

Figure 6:
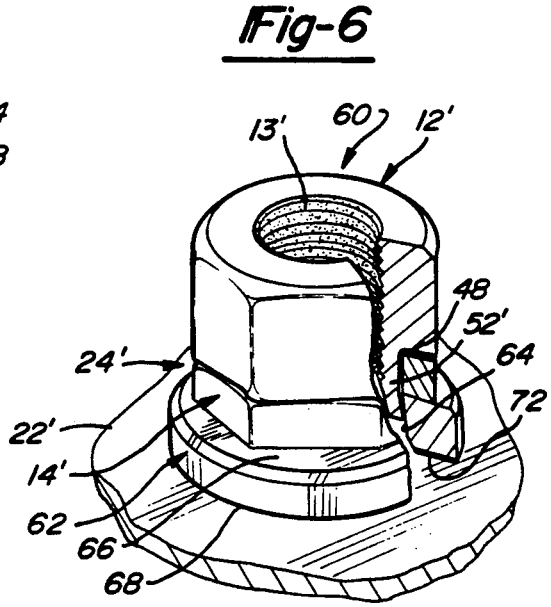
FIG. 6 is a perspective view, partially in section, of the three-piece nut of this invention.

In the three-piece nut 60 of FIG. 6, the washer member 62 provides an outer face 66 and an inner face 68 which constitute working surfaces of the lock nut 60 which are under the control of the nut manufacturer as opposed to the nut user. This provides a locking fastener which does not cause any scouring or galling of the workpiece surface and which permits an accurate predetermined relationship of torque/tension with extremely high repeatability. In this three-piece nut, the coefficient of friction between the washer face 68 and the workpiece 22' is greater than the coefficient of friction between the engaging faces of the threadless nut 14' and washer 66 which in turn is greater than the coefficient of friction between the threads and the engaging faces of the threaded nut member 12' and threadless nut member 14'. The inner face 68 of the washer 62 has a very high coefficient of friction with the surface of the workpiece; this is provided by a coating 72 with a high coefficient of friction.

When the three-piece lock nut 60 is installed, the washer 62 rotates very little upon initial tightening and as the tightening proceeds rotation ceases. The washer will not rotate under vibrational forces and it will not rotate when the nut is removed.

Figure 7:
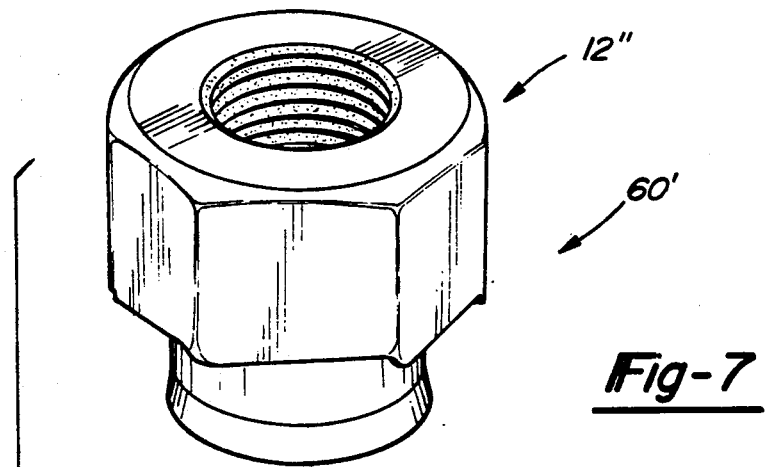
FIG. 7 is a perspective view of another embodiment of the three-piece nut.
Figure 8:
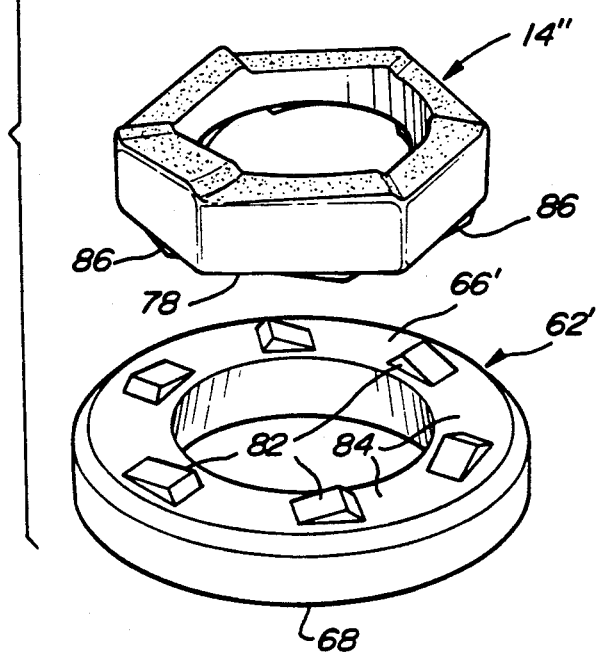
FIG. 8 is a plan view of the inner face of a member.
Figure 8:
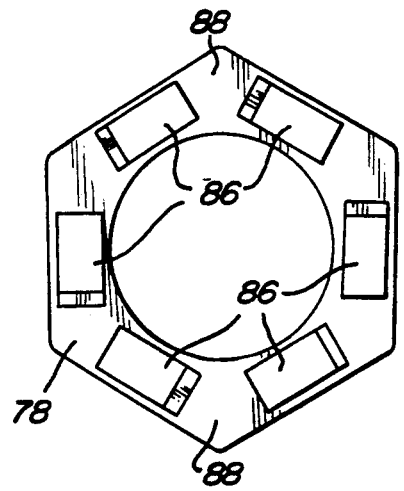
Figure 9:
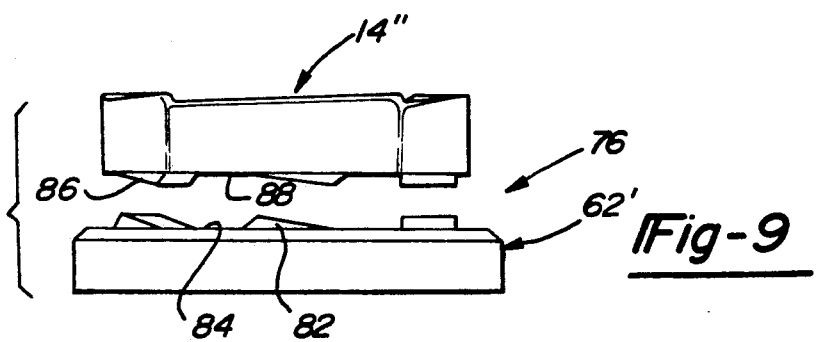
FIG. 9 shows the relationship of two members.

An additional embodiment of the invention in the three-piece lock nut 60' will be described with reference to FIGS. 7, 8 and 9. In this embodiment, the nut member 12" is the same as the threaded nut member 12' of FIG. 6; the threadless nut member 14" and the washer member 62' differ from nut member 14' and washer 62 of FIG. 6 only in the following respects. A mechanical coupling 76 is provided between the outer face 66' of washer 62' and the inner face 78 of the unthreaded nut member 14". This mechanical coupling comprises a plurality of ramps 82 on the outer face 66' of the washer 62'. The ramps are spaced apart by plateaus 84. It is noted that ramps 82 have a gradual inclination commencing at the plateau level at the low end extending to the high end of the ramp therefrom in a tightening direction of the threaded nut member 12". The high end of the ramp declines to the plateau level at a relatively steep angle. The inner face 78 of the unthreaded nut member is provided with ramps 86 which are separated by plateaus 88 of the same construction as ramps 82 and plateaus 84. This coupling arrangement provides a controlled resistance to rotation in both directions with a greater off torque (removal torque) than would be obtained without the ramps. If desired, greater off torque than on torque can be achieved with the ramp design.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a locking threaded fastener of the type comprising a threaded shank with threads advancing axially of the shank in a tightening direction from an outer end to an inner end, and a nut assemblage including a first nut member having a through-hole for a clearance fit with the threaded shank and including a second nut member with a threaded hole for threaded engagement with the threaded shank, the second nut member being disposed nearer the outer end of the threaded shank than the first nut member whereby a workpiece surface may be disposed between the first nut member and the inner end of the threaded shank, said nut assemblage also including means for coupling the first and second nut members together for rotation together when the second nut member is rotated in the tightening direction and wedge means for wedging the first and second nut member axially apart in response to rotation of the second nut member relative to the shank in the loosening direction, the wedge means having a wedge angle which is greater than the angle of the threads whereby such rotation causes the threads to jam and inhibit loosening of the second nut member, the improvement in said nut assemblage including:
- a third nut member having a through-hole for a clearance fit with said threaded shank and being disposed with the first nut member between it and the second nut member,
- a flat inner surface on the third nut member for engaging the workpiece,
- a flat outer surface on the third nut member and a flat inner surface on the first nut member for engagement with the flat outer surface on the third nut member,
- said wedge means having engaging surfaces with a coefficient of friction less than the coefficient of friction between the flat outer surface on the third nut member and the flat inner surface on the first nut member, the last mentioned coefficient being less than that between the flat inner surface of the third nut and workpiece.

2. The improvement in said nut assemblage as defined in claim 1 and wherein,
said wedge means comprises a plurality of ramp surfaces on the outer face of said first nut member and a corresponding plurality of ramp surfaces on the inner face of said second nut member and substantially axially extending shoulders extending between adjacent ramps whereby rotation of the second nut member in the tightening direction causes driving engagement between the shoulders on said second nut member and shoulders on said first nut member and whereby the engagement of said ramp surfaces upon rotation of said second nut member relative to said first nut member causes axial movement of the second nut member relative to said first nut member.

3. The improvement in said nut assemblage as defined in claim 2 and wherein said first and second nut members both have plural tool receiving facets of the same configuration and in alignment with each other when said shoulders are engaged.

4. The improvement in said nut assemblage as defined in claim 2 and wherein:
the surface of said threaded hole in the second nut member and the surface of said ramps on said second nut member comprises a lubricating coating.

5. The improvement in said nut assemblage as defined in claim 2 and wherein:
said second nut member has an axially extending cylindrical sleeve extending into the through-hole of said first nut member and having a radial flange which is of larger diameter than a portion of said through-hole whereby axial motion between the first and second nut members is limited.

6. The improvement in said nut assemblage as defined in claim 5 and wherein:
said threaded hole in said second nut member includes threads extending from the outer face thereof into said cylindrical sleeve.

7. In a locking threaded fastener of the type comprising a threaded shank with threads advancing axially of the shank in a tightening direction from an outer end to an inner end, and a nut assemblage including a first nut member having a through-hole for a clearance fit with the threaded shank and including a second nut member with a threaded hole for threaded engagement with the threaded shank, the second nut member being disposed nearer the outer end of the threaded shank than the first nut member whereby a workpiece surface may be disposed between the first nut member and the inner end of the threaded shank, said nut assemblage also including means for coupling the first and second nut members together for rotation together when the second nut member is rotated in the tightening direction and wedge means for wedging the first and second nut member axially apart in response to rotation of the second nut member relative to the shank in the loosening direction, the wedge means having a wedge angle which is greater than the angle of the threads whereby such rotation causes the threads to jam and inhibit loosening of the second nut member, the improvement including:
- a third nut member having an inner surface and an outer surface and having a through-hole for a clearance fit with said threaded shank, the first nut member being disposed between said second and third nut members,
- said inner surface on the third nut member being flat and adapted to engage the workpiece,
- means for rotatably coupling the first nut member and the third nut member with less torque transmission from the first nut member in the tightening direction to the third nut member than in the loosening direction,
- said wedge means having engaging surfaces with a coefficient of friction less than that between the inner surface of the third nut member and the workpiece.

8. The improvement in said nut assemblage as defined in claim 7 and wherein:
said coupling means comprises a plurality of ramps on the outer surface of said third nut member and a corresponding plurality of ramps on the inner face of said first nut member, an inclined shoulder extending between adjacent ramps on each surface, said shoulders extending more axially than said ramps, said shoulders on said first nut member engaging corresponding shoulders on said third nut member when said first nut member is turned in the loosening direction relative to said third nut member.

* * * * *